United States Patent
Lee et al.

(10) Patent No.: US 11,475,232 B1
(45) Date of Patent: Oct. 18, 2022

(54) METHOD AND APPARATUS FOR PROCESSING IMAGE

(71) Applicant: Suprema Inc., Gyeonggi-do (KR)

(72) Inventors: Hyogi Lee, Gyeonggi-do (KR); Kideok Lee, Gyeonggi-do (KR); Bong Seop Song, Gyeonggi-do (KR)

(73) Assignee: Suprema Inc., Gyeonggi-do (KR)

( * ) Notice: Subject to any disclaimer, the term of this patent is extended or adjusted under 35 U.S.C. 154(b) by 0 days.

(21) Appl. No.: 17/538,666

(22) Filed: Nov. 30, 2021

(30) Foreign Application Priority Data

Oct. 28, 2021 (KR) .................. 10-2021-0145609

(51) Int. Cl.
| | |
|---|---|
| *G06K 9/00* | (2022.01) |
| *G06K 9/62* | (2022.01) |
| *G06T 7/60* | (2017.01) |
| *G06T 3/60* | (2006.01) |
| *G06V 10/82* | (2022.01) |
| *G06V 40/16* | (2022.01) |
| *G06N 3/08* | (2006.01) |

(52) U.S. Cl.
CPC ......... *G06K 9/6201* (2013.01); *G06K 9/6257* (2013.01); *G06N 3/08* (2013.01); *G06T 3/60* (2013.01); *G06T 7/60* (2013.01); *G06V 10/82* (2022.01); *G06V 40/161* (2022.01); *G06V 40/172* (2022.01); *G06T 2200/04* (2013.01); *G06T 2207/10024* (2013.01); *G06T 2207/10048* (2013.01); *G06T 2207/20081* (2013.01); *G06T 2207/20084* (2013.01); *G06T 2207/30201* (2013.01)

(58) Field of Classification Search
CPC .. G06K 9/6201; G06K 9/6257; G06V 40/172; G06V 10/82; G06N 3/08; G06T 3/60; G06T 7/60; G06T 2200/04; G06T 2207/10024; G06T 2207/10048; G06T 2207/20081; G06T 2207/20084; G06T 2207/30201
See application file for complete search history.

(56) References Cited

U.S. PATENT DOCUMENTS 5,668,595 A * 9/1997 Katayama ............. G06T 3/0075
348/43
8,331,616 B2 * 12/2012 Sabe ..................... G06V 40/165
382/103

(Continued)

FOREIGN PATENT DOCUMENTS

| JP | 2009-157767 A | 7/2009 |
|---|---|---|
| KR | 10-2016-0033553 A | 3/2016 |

(Continued)

*Primary Examiner* — Gregory M Desire
(74) *Attorney, Agent, or Firm* — Maier & Maier, PLLC

(57) ABSTRACT

A method for processing an image, which is performed by an image processing apparatus, is provided. The method includes acquiring a first image including an object and a second image including an object identical to the object in the first image under the same condition, acquiring three-dimensional direction information of a specific part of the object in the first image, and providing a three-dimensionally processed image by three-dimensionally rotating the object in the second image by an angle that corresponds to the acquired three-dimensional direction information of the specific part of the object in the first image.

15 Claims, 2 Drawing Sheets

(56) References Cited

U.S. PATENT DOCUMENTS

| | | | | |
|---|---|---|---|---|
| 8,538,078 | B2* | 9/2013 | Berkovich | G06F 16/583 |
| | | | | 382/103 |
| 2003/0080923 | A1* | 5/2003 | Suyama | H04N 13/395 |
| | | | | 348/E13.052 |
| 2005/0093713 | A1* | 5/2005 | Orme | G03B 35/14 |
| | | | | 340/815.4 |
| 2019/0289285 | A1* | 9/2019 | Nashida | H04N 13/366 |
| 2020/0019760 | A1* | 1/2020 | Ma | G06V 40/45 |
| 2022/0044039 | A1* | 2/2022 | Ren | G06T 7/50 |

FOREIGN PATENT DOCUMENTS

| | | | |
|---|---|---|---|
| KR | 1020170091895 | B1 | 10/2018 |
| KR | 10-2019-0098858 | A | 8/2019 |

\* cited by examiner

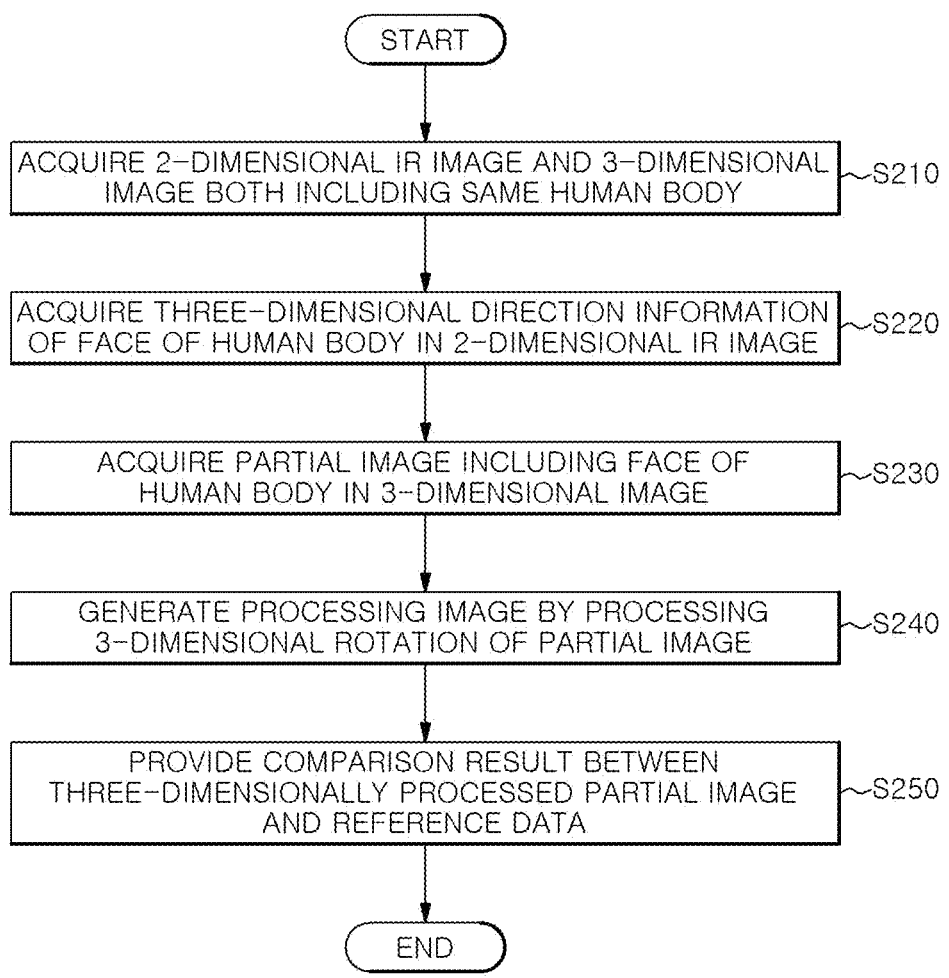

METHOD AND APPARATUS FOR PROCESSING IMAGE

CROSS-REFERENCE TO RELATED APPLICATION

This application claims priority to Korean Patent Application No. 10-2021-0145609, filed on Oct. 28, 2021. The entire contents of the application on which the priority is based are incorporated herein by reference.

TECHNICAL FIELD

The present disclosure relates to an apparatus for processing an image and a method for processing an image by the apparatus.

This work was supported by Institute of Information & communications Technology Planning & Evaluation (IITP) grant funded by the Korea government(MSIT) (Project unique No.: 1711120097; Project No.: 2020-0-01787-001; Government department: Ministry of Science and ICT; R&D management Agency: Institute of Information & communications Technology Planning & Evaluation; R&D project: ITRC R&D; Research Project Title: Development of communication/computing-integrated revolutionary technologies for superintelligent services; Managing department: Korea Advanced Institute of Science and Technology; and Project period: 2021.01.01≈2021.12.31).

BACKGROUND

Image processing is currently used in various industrial fields. Specifically, in the field of security, image processing for facial recognition and facial authentication becomes more significant than ever before.

For the facial recognition through image processing, 2-dimensional facial image authentication and 3-dimensional facial image authentication are generally used.

In the 2-dimensional facial image authentication, a face detection is performed in a 2-dimensional facial image, unique characteristics are extracted from the detected face, and the authentication is determined depending on a degree to which the extracted characteristic information matches the registered characteristic information. Such 2-dimensional facial image authentication has a disadvantage in that the authentication performance may be degraded due to a direction of the detected face.

In contrast, in the 3-dimensional facial image authentication, a face is detected by using 3-dimensional data information extracted by a 3-dimensional imaging device, unique characteristics of the detected 3-dimensional face information are extracted, and the authentication is determined depending on a degree to which the extracted characteristic information matches the registered characteristic information. The 3-dimensional facial image authentication uses a 3-dimensional image matching algorithm that finds a center part (e.g., nose) of a face, extracts 3-dimensional characteristic information around the center part, and identifies a degree to which the extracted 3-dimensional characteristic information matches the registered characteristic information. The 3-dimensional facial image authentication may overcome the disadvantage of the 2-dimensional facial image authentication, that is, the authentication performance degradation caused by a direction of the detected face through the 3-dimensional image matching algorithm.

However, a significant amount of time is required to perform the 3-dimensional image matching algorithm that finds the center part of the face and extracts 3-dimensional characteristic information around the center part. Therefore, it takes a long time to finally obtain a face authentication result (see, e.g., Korean Patent No. 10-1906431 registered on Oct. 2, 2018).

SUMMARY

In view of the above, embodiments of the present disclosure provides a method and an apparatus for processing an image to quickly provide a processing image appropriate for biometric authentication such as face authentication by using a plurality of images including objects identical to each other.

Aspects of the present disclosure are not limited to those set forth herein. The above and other aspects of the present disclosure will become more apparent to one of ordinary skill in the art to which the present disclosure pertains by referencing the detailed description of the present disclosure given below.

In accordance with an aspect of the present disclosure, there is provided a method for processing an image performed by an image processing apparatus, the method including: acquiring a first image including an object and a second image including an object identical to the object in the first image under the same condition; acquiring three-dimensional direction information of a specific part of the object in the first image; and providing a three-dimensionally processed image by three-dimensionally rotating the object in the second image by an angle that corresponds to the acquired three-dimensional direction information of the specific part of the object in the first image.

In accordance with another aspect of the present disclosure, there is provided an apparatus for processing an image, the apparatus including: an acquisition unit configured to acquire a first image including an object and a second image including an object identical to the object in the first image under the same condition; and a processor configured to provide a processing image obtained by using the first image and the second image. Further, the processor acquires three-dimensional direction information of a specific part of the object in the first image; and provides the processing image by three-dimensionally rotating the object in the second image by an angle that corresponds to the acquired three-dimensional direction information of the specific part of the object in the first image.

In accordance with still another aspect of the present disclosure, there is provided a non-transitory computer-readable storage medium including computer-executable instructions which cause, when executed by a processor, the processor to perform the method described above.

In accordance with still another aspect of the present disclosure, there is provided a computer program stored in a non-transitory computer-readable storage medium, the computer program including computer-executable instructions which cause, when executed by a processor, the processor to perform the method described above.

According to the aspects of the present disclosure, it is possible to provide a method and an apparatus for processing an image for quickly providing a processing image appropriate for biometric authentication such as face authentication by using a plurality of images including objects identical to each other. For example, a processing image appropriate for face authentication, which is a result of processing a 3-dimensional rotation of a 3-dimensional face image based on three-dimensional direction information of a specific part acquired from a 2-dimensional face image, can be quickly provided. As such, the three-dimensionally rotated face image may be quickly provided, and thus, the face authentication result may also be quickly obtained.

BRIEF DESCRIPTION OF THE DRAWINGS

FIG. 2 is a flowchart illustrating an image processing method performed by the image processing apparatus according to the embodiment of the present disclosure.

DETAILED DESCRIPTION

Figure 1:
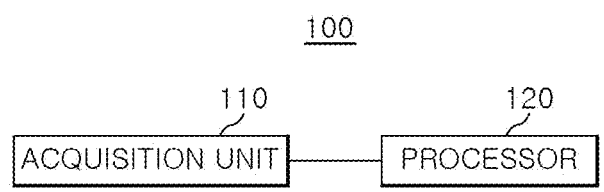
FIG. 1 shows a configuration of an image processing apparatus according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 shows a configuration of an image processing apparatus 100 according to an embodiment of the present disclosure.

Referring to FIG. 1, the image processing apparatus 100 according to an embodiment includes an acquisition unit 110 and a processor 120.

The acquisition unit 110 is configured to acquire a first image and a second image both including the same object under the same condition and provide the acquired first image and the acquired second image to the processor 120.

The processor 120 is configured to provide a processing image obtained by using the first image and the second image. For example, the processor 120 may include at least one of a microprocessor, a central processing unit (CPU) and a graphics processing unit (GPU).

Here, the first image may be a 2-dimensional image, and the second image may be a 3-dimensional image. Further, the 2-dimensional image may be a 2-dimensional infrared ray (IR) image or a 2-dimensional color image. In addition, the object may be a human body to be used for authentication. The following description will be made in consideration of an example in which a face image appropriate for face authentication of a human body (i.e., biometric authentication) is provided as a processing image by using the 2-dimensional IR image and the 3-dimensional image both including human bodies.

The acquisition unit 110 acquires the 2-dimensional IR image and the 3-dimensional image that include the same human body under the same condition and provides the acquired 2-dimensional IR image and the acquired 3-dimensional image to the processor 120. For example, the acquisition unit 110 may include a 2-dimensional IR camera for acquiring the 2-dimensional IR image by capturing an image of the human body and a 3-dimensional image equipment for generating the 3-dimensional image of the human body. Alternatively, the acquisition unit 110 may receive the 2-dimensional IR image and the 3-dimensional image from an external device through an interface or receive the 2-dimensional IR image and the 3-dimensional image through a communication channel.

The processor 120 may provide a 3-dimensional image appropriate for face authentication of the human body by using the 2-dimensional IR image and the 3-dimensional image.

Here, the processor 120 may acquire three-dimensional direction information of a specific part (e.g., face) of the human body in the 2-dimensional IR image. For example, the processor 120 may acquire three-dimensional direction information of a face by using an artificial intelligence neural network model which is trained with a training data set in advance, the training data set including a plurality of training 2-dimensional images as input data and including, as label data, a 3-dimensional object corresponding to an object included in each of the plurality of training 2-dimensional images and three-dimensional direction information of a specific part of the 3-dimensional object (e.g., human body).

Furthermore, the processor 120 may process a 3-dimensional rotation in such a manner that the human body in the 3-dimensional image is three-dimensionally rotated by an angle that corresponds to the three-dimensional direction information of the human body (e.g., face) acquired from the 2-dimensional IR image and provide the 3-dimensional image as a processing image. For example, the processor 120 may acquire a partial image including a face of an object in the 3-dimensional image, process a 3-dimensional rotation of the acquired partial image by three-dimensionally rotating the acquired partial image by an angle that corresponds to the three-dimensional direction information of the human body (e.g., face) acquired from a 2-dimensional image, and provide a comparison result that represents whether the three-dimensionally rotated partial image and pre-stored reference data show the same face. Here, the pre-stored reference data may include facial data for authentication having a plurality of facial images that are registered in advance.

FIG. 2 is a flowchart illustrating an image processing method performed by the image processing apparatus 100 according to the embodiment of the present disclosure.

Hereinafter, a method performed by the image processing apparatus 100 according to the embodiment of the present disclosure will be described. Specifically, the method for processing authentication for a face of an object by using the 2-dimensional IR image and the 3-dimensional image both including the same object will be described in detail.

First, the acquisition unit 110 of the image processing apparatus 100 acquires the 2-dimensional IR image and the 3-dimensional image of a human body that is a face authentication target under the same condition and provides the acquired 2-dimensional IR image and the acquired 3-dimensional image to the processor 120 of the image processing apparatus 100. Here, the 2-dimensional IR image and the 3-dimensional image may be images of the same object photographed and generated in the same condition or a similar condition in which the difference is negligible (step S210).

Furthermore, the processor 120 acquires three-dimensional direction information of a specific part (e.g., face) of the human body in the 2-dimensional IR image. Here, the processor 120 may acquire three-dimensional direction information of a face by using an artificial intelligence neural network model which is trained with a training data set in advance, the training data set including a plurality of training 2-dimensional images as input data and including, as label data, a 3-dimensional object corresponding to an object included in each of the plurality of training 2-dimensional images and three-dimensional direction information of a specific part of the 3-dimensional object (e.g., human body). The processor 120 may input the 2-dimensional IR image acquired in step S210 to the artificial intelligence neural network model trained in advance and estimate the three-dimensional direction information of the face as an output of the artificial intelligence neural network model (step S220). Here, for example, the three-dimensional direction information of a specific part (e.g., face) of an object (e.g., human body) obtained from a 2-dimensional image may be vector values of yaw, pitch, and roll information of the specific part of the object.

In addition, the processor 120 may process a 3-dimensional rotation in such a manner that the human body in the 3-dimensional image acquired in step S210 is three-dimensionally rotated by an angle that corresponds to the three-dimensional direction information acquired in step S220 and provide a comparison result between the three-dimensionally rotated image and pre-stored reference data. For example, the processor 120 generates vector values of yaw, pitch, and roll information of the specific part of the object from a 2-dimensional image, and then the specific part of a 3-dimensional object in a 3-dimensional image, which corresponds to the object in the 2-dimensional image, is rotated based on the vector values of yaw, pitch, and roll information obtained from the 2-dimensional image to face the front side (look straight ahead). Here, in order to improve an image processing speed by reducing a data size of image processing, the processor 120 may process the 3-dimensional rotation after acquiring a partial image including the face from the 3-dimensional image acquired in step S210.

For example, the processor 120 may acquire the partial image including the face of the human body in the 3-dimensional image acquired in step S210 (step S230).

Furthermore, the processor 120 may process the 3-dimensional rotation of the partial image acquired in step S230 in such a manner that the partial image is three-dimensionally rotated by an angle that corresponds to the three-dimensional direction information acquired in step S220. For example, in the case that three-dimensional direction information indicating that the face is rotated by an angle A (10°) in a positive side of a horizontal direction is acquired in step S220, the processor 120 may three-dimensionally rotate the partial image acquired in step S230 by the angle A)(−10° in a negative side of the horizontal direction so as to generate a 3-dimensional partial image having a face such that the face faces the front side. Here, since the processor 120 processes a 3-dimensional rotation for the 3-dimensional image based on the three-dimensional direction information acquired in step S220, the processor 120 provides the 3-dimensional partial image having the face that faces the front side quickly in comparison with the case of processing only a 3-dimensional rotation for the 3-dimensional image without any reference information (the three-dimensional direction information acquired from the 2-dimensional image) (step S240).

Further, the processor 120 may provide a comparison result between the three-dimensionally rotated partial image including the face and reference data. For example, the processor 120 may extract 3-dimensional characteristic information of the three-dimensionally rotated partial image including the face, compare the extracted 3-dimensional characteristic information with pre-stored characteristic information that is the reference data to provide a face authentication result that determines whether the comparison result shows the same face. Here, since the 3-dimensional partial image including the face is quickly provided in step S240, the face authentication result may also be quickly provided (step S250).

Meanwhile, each step included in the image processing method performed by the image processing apparatus according to the embodiment described above may be implemented in a non-transitory computer-readable storage medium that stores a computer program including instructions for performing each step.

As described above, the method and the apparatus for processing an image according to the embodiments may quickly provide a processing image appropriate for biometric authentication such as face authentication by using a plurality of images including the same object. For example, the method and the apparatus for processing an image may quickly provide a processing image appropriate for face authentication that is a result of processing a 3-dimensional rotation of a 3-dimensional face image based on three-dimensional direction information of a specific part acquired from a 2-dimensional face image. As such, the three-dimensionally rotated face image may be quickly provided, and thus, the face authentication result may also be quickly obtained.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for processing an image performed by an image processing apparatus, the method comprising:
    acquiring a first image including an object and a second image including the object in the first image under the same condition;
    acquiring three-dimensional direction information of a specific part of the object in the first image; and
    providing a three-dimensionally processed image by three-dimensionally rotating the object in the second image by an angle that corresponds to the acquired three-dimensional direction information of the specific part of the object in the first image,
    wherein, in the providing the three-dimensionally processed image, a partial image including the specific part of the object in the second image is acquired, and then, a three-dimensionally processed partial image is provided by three-dimensionally rotating the partial image by the angle that corresponds to the acquired three-dimensional direction information of the specific part of the object in the first image.

2. The method of claim 1, wherein the first image is a 2-dimensional image, and the second image is a 3-dimensional image.

3. The method of claim 2, wherein the 2-dimensional image is a 2-dimensional infrared ray (IR) image or a 2-dimensional color image.

4. The method of claim 1, wherein the object is a human body, and the specific part is a face of the human body.

5. The method of claim 1, wherein, in the acquiring the three-dimensional direction information, the three-dimensional direction information is acquired by using an artificial intelligence neural network model which is trained with input data and label data, and
    the input data includes a plurality of training 2-dimensional images, and the label data includes three-dimensional direction information of a specific part of an object included in each of the plurality of training 2-dimensional images.

6. The method of claim 1, further comprises providing a comparison result between the three-dimensionally processed partial image and reference data.

7. The method of claim 6, wherein the object is a human body, and the specific part is a face of the human body, and
    wherein, in the providing the comparison result, the comparison result is information that indicates whether the three-dimensionally processed partial image and the reference data show the same face.

8. An apparatus for processing an image, the apparatus comprising:
    an acquisition unit configured to acquire a first image including an object and a second image including the object in the first image under the same condition; and
    a processor configured to provide a processing image obtained by using the first image and the second image,
    wherein the processor
    acquires three-dimensional direction information of a specific part of the object in the first image; and
    provides the processing image by three-dimensionally rotating the object in the second image by an angle that corresponds to the acquired three-dimensional direction information of the specific part of the object in the first image,
    wherein the processor acquires a partial image including the specific part of the object in the second image, and then provides a three-dimensionally processed partial image by three-dimensionally rotating the partial image by an angle that corresponds to the acquired three-dimensional direction information of the specific part of the object in the first image.

9. The apparatus of claim 8, wherein the first image is a 2-dimensional image, and the second image is a 3-dimensional image.

10. The apparatus of claim 9, wherein the 2-dimensional image is a 2-dimensional infrared ray (IR) image or a 2-dimensional color image.

11. The apparatus of claim 8, wherein the object is a human body, and the specific part is a face of the human body.

12. The apparatus of claim 8, wherein the processor acquires the three-dimensional direction information by using an artificial intelligence neural network model which is trained with input data and label data, and
    the input data includes a plurality of training 2-dimensional images, and the label data includes three-dimensional direction information of a specific part of an object included in each of the plurality of training 2-dimensional images.

13. The apparatus of claim 8,
the processor further provides a comparison result between the three-dimensionally processed partial image and reference data.

14. The apparatus of claim 13, wherein the object is a human body, and the specific part is a face of the human body, and
wherein the processor provides, as the comparison result, information that indicates whether the three-dimensionally processed partial image and the reference data show the same face.

15. A non-transitory computer-readable storage medium including computer-executable instructions which cause, when executed by a processor, the processor to perform a method for processing an image performed by an image processing apparatus, the method comprising:
acquiring a first image including an object and a second image including the object in the first image under the same condition;
acquiring three-dimensional direction information of a specific part of the object in the first image; and
providing a three-dimensionally processed image by three-dimensionally rotating the object in the second image by an angle that corresponds to the acquired three-dimensional direction information of the specific part of the object in the first image,
wherein, in the providing the three-dimensionally processed image, a partial image including the specific part of the object in the second image is acquired, and then, a three-dimensionally processed partial image is provided by three-dimensionally rotating the partial image by the angle that corresponds to the acquired three-dimensional direction information of the specific part of the object in the first image.

\* \* \* \* \*